US009622086B2

(12) United States Patent
Salhab et al.

(10) Patent No.: US 9,622,086 B2
(45) Date of Patent: Apr. 11, 2017

(54) PRIMARY CHANNEL SELECTION METHOD FOR RELAY NETWORKS

(71) Applicant: KING FAHD UNIVERSITY OF PETROLEUM AND MINERALS, Dhahran (SA)

(72) Inventors: Anas (M. A.) Ata Salhab, Dhahran (SA); Salam Adel Zummo, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 99 days.

(21) Appl. No.: 14/746,782

(22) Filed: Jun. 22, 2015

(65) Prior Publication Data

US 2016/0374083 A1    Dec. 22, 2016

(51) Int. Cl.
| | |
|---|---|
| *H04W 16/14* | (2009.01) |
| *H04W 88/04* | (2009.01) |
| *H04W 72/12* | (2009.01) |
| *H04W 28/02* | (2009.01) |
| *H04W 72/04* | (2009.01) |
| H04W 84/04 | (2009.01) |

(52) U.S. Cl.
CPC ....... *H04W 16/14* (2013.01); *H04W 28/0252* (2013.01); *H04W 72/0453* (2013.01); *H04W 72/12* (2013.01); *H04W 88/04* (2013.01); H04W 84/047 (2013.01)

(58) Field of Classification Search
CPC ............. H04W 74/00; H04W 74/0866; H04W 28/0231; H04W 72/1226; H04W 28/0252; H04W 28/0263; H04W 72/12; H04W 72/0453; H04W 84/047; H04W 88/04; H04W 16/14

See application file for complete search history.

(56) References Cited

U.S. PATENT DOCUMENTS

| | | | |
|---|---|---|---|
| 2006/0084444 A1 | 4/2006 | Kossi et al. | |
| 2009/0247201 A1* | 10/2009 | Ye | H04W 16/14 455/509 |
| 2011/0165850 A1* | 7/2011 | Xin | H04W 16/14 455/161.1 |
| 2012/0108276 A1* | 5/2012 | Lang | H04L 27/0006 455/501 |

(Continued)

OTHER PUBLICATIONS

Atapattu et al., "Energy detection based cooperative spectrum sensing in cognitive radio networks", Wireless Communications, IEEE Transactions on 10.4 (2011): 1232-1241.

(Continued)

*Primary Examiner* — Ashley Shivers
(74) *Attorney, Agent, or Firm* — Richard C. Litman

(57) ABSTRACT

The primary channel selection method for relay networks functions in a relaying cognitive network where a number of relays are used to forward the source message to destination. The primary users utilize orthogonal spectrum bands. One primary user is selected among the available primary users in order to share its spectrum with the secondary users (source and relay). A certain amount of interference is allowed between the primary and secondary users when the primary users' channels are shared by the secondary users.

20 Claims, 9 Drawing Sheets

(56) References Cited

U.S. PATENT DOCUMENTS

| | | | |
|---|---|---|---|
| 2013/0114500 A1* | 5/2013 | Liu .................... | H04B 7/024 370/315 |
| 2013/0273833 A1 | 10/2013 | Wang et al. | |
| 2014/0226609 A1* | 8/2014 | Hooli ................. | H04W 16/14 370/329 |

OTHER PUBLICATIONS

Attar et al. "Interference-limited resource allocation for cognitive radio in orthogonal frequency-division multiplexing networks", IET communications 2.6 (2008): 806-814.

Bletsas et al., "A simple cooperative diversity method based on network path selection", Selected Areas in Communications, IEEE Journal on 24.3 (2006): 659-672.

Letaief et al., "Cooperative communications for cognitive radio networks", Proceedings of the IEEE 97.5 (2009): 878-893.

Ngo, Duy T., Chintha Tellambura, and Ha H. Nguyen. "Resource allocation for OFDMA-based cognitive radio multicast networks with primary user activity consideration", Vehicular Technology, IEEE Transactions on 59.4 (2010): 1668-1679.

Zafar at al. "Minimizing symbol error rate for cognitive relaying with opportunistic access", Cognitive Radio Oriented Wireless Networks and Communications (CROWNCOM), 2012 7th International ICST Conference on. IEEE, 2012.

Zhang, Rui, and Ying-Chang Liang. "Exploiting multi-antennas for opportunistic spectrum sharing in cognitive radio networks", Selected Topics in Signal Processing, IEEE Journal of 2.1 (2008): 88-102.

\* cited by examiner

PRIMARY CHANNEL SELECTION METHOD FOR RELAY NETWORKS

BACKGROUND OF THE INVENTION

1. Field of the Invention

The present invention relates to the use of orthogonal spectrum bands in cellular networks, and particularly to a primary channel selection method for relay networks where primary users utilize orthogonal spectrum bands to improve secondary user (SU) performance.

2. Description of the Related Art

In a decode-and-forward (DF) relay scheme primary user (PU) receivers are generally not deemed to use orthogonal spectra, i.e., cognitive relay networks (CRNs) with multiple primary user (PU) receivers operate with PU receivers utilizing the same spectrum band. This usage scheme of the PU receivers in the context of an opportunistic DF relay cognitive network is to the detriment of the quality of reception of the secondary user (SU) receivers.

Thus, a primary channel selection method for relay networks solving the aforementioned problems is desired.

SUMMARY OF THE INVENTION

The primary channel selection method for relay networks functions in a relaying cognitive network where a number of relays are used to forward the source message to destination. The primary users utilize orthogonal spectrum bands. One primary user is selected among the available primary users in order to share its spectrum with the secondary users (source and relay). A certain amount of interference is allowed between the primary and secondary users when the primary users' channels are shared by the secondary users.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The primary channel selection method for relay networks functions in a relaying cognitive network where a number of relays are used to forward the source message to destination. The primary users utilize orthogonal spectrum bands, thus the present primary channel selection method provides opportunistic DF CRNs with multiple PU receivers using orthogonal spectrum bands. One primary user is selected among the available primary users in order to share its spectrum with the secondary users (source and relay). A certain amount of interference is allowed between the primary and secondary users when the primary users' channels are shared by the secondary users. Using orthogonal spectrum bands in cellular networks reduces the interference between users in the same way that downlink transmissions using orthogonal frequency bands are used by base stations in transmitting data for different users. The primary channel selection method for relay networks spans a secondary source, multiple secondary relays, a secondary destination, a primary transmitter and multiple primary receivers, and involves selection of a primary receiver out of the available primary receivers in such a way as to enhance the performance of the secondary system.

Figure 1:
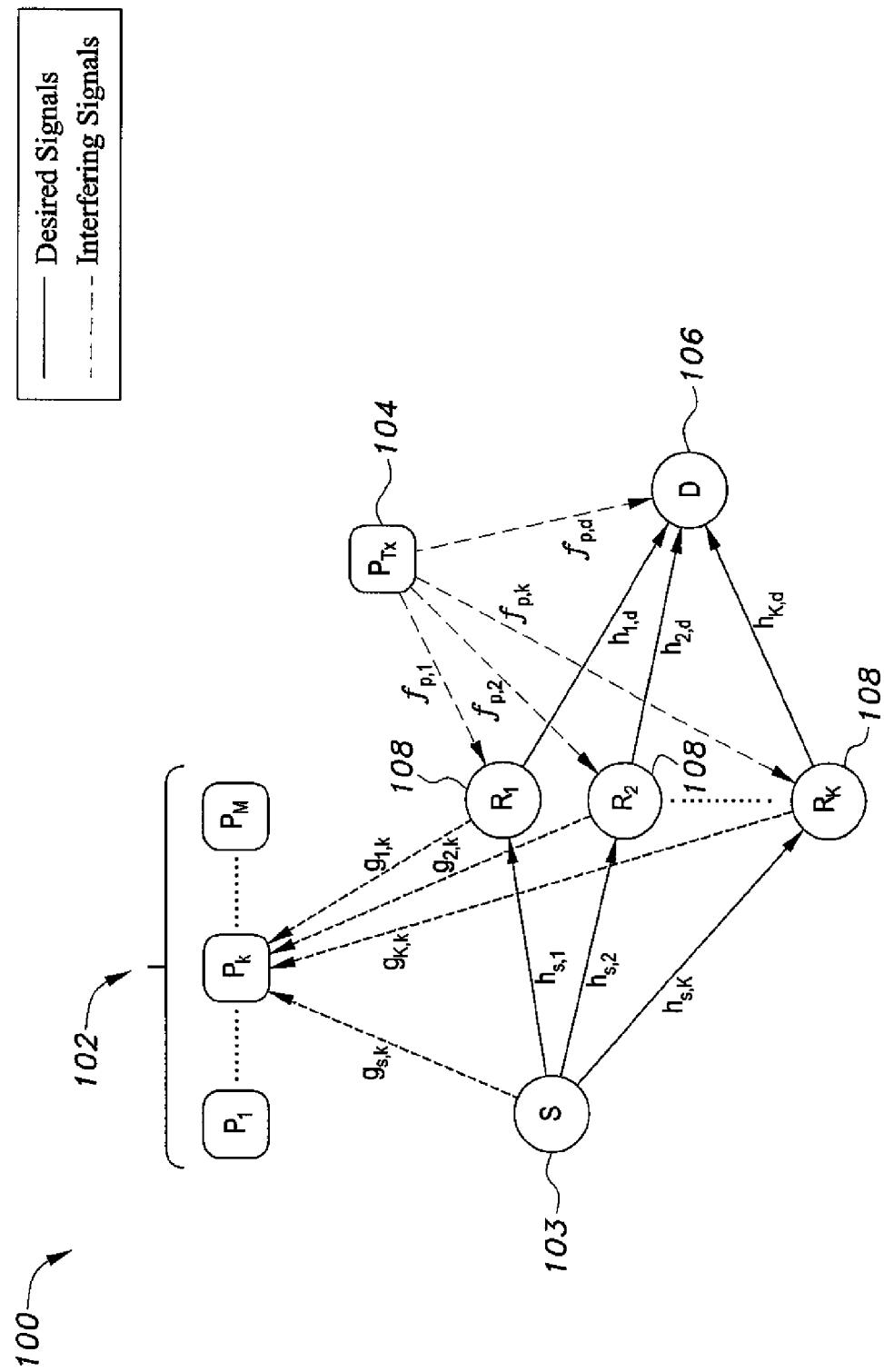
FIG. 1 is a schematic diagram showing a cognitive opportunistic DF (decode and forward) relay network with interference and multiple PU (primary user) receivers used in a primary channel selection method for relay networks according to the present invention.

As shown in FIG. 1, a dual-hop spectrum-sharing relay network 100 includes one secondary user (SU) source S 103, K DF SU relays $R_k$ 108 (k=1, ... , K), one SU destination D 106, M primary user (PU) receivers $P_m$ 102 (m=1, ... , M) using orthogonal frequency bands, and one PU transmitter $P_{Tx}$ 104. All nodes are assumed to be equipped with single antenna and the communication is assumed to operate in a half-duplex mode. Also, a downlink transmission is assumed to be conducted between the PU transmitter 104 or base station and its PU receivers 102. The SU users need to share the spectrum with the PU receiver whose channel results in a best performance for the secondary system. At the same time, the K SU relays 108 and destination 106 will be corrupted by interference from the PU transmitter or base station 104 $P_{Tx}$. The direct link is assumed to be in a deep fade and hence, it is neglected in the analysis. The communications take place in two phases. In the first phase, the SU source 103 sends its message x to K relays under a transmit power constraint which guarantees that the interference with the selected PU receiver $P_{Sel}$ does not exceed a threshold $I_p$. To satisfy the PU interference constraint and result in a best performance for the secondary system, the SU source S 103 must transmit at a power given by $$P_s = I_p \Big/ \min_m |g_{s,m}|^2,$$

where $g_{s,m}$ is the channel coefficient of the S→$P_m$ link. The received signal at the $k^{th}$ relay can be expressed as:

$$\gamma_{S,k} = \sqrt{P_s} h_{S,k} x_0 + \sqrt{P_p^1} f_{p,k} x_p + n_k, \quad (1)$$

where $h_{S,k}$ is the channel coefficient of the S→$R_k$ link, $x_0$ is the transmitted symbol from the SU source S with $\mathbb{E}\{|x_0|^2\} = P_0$, $f_{p,k}$ is the channel coefficient of the $P_{Tx}$→$R_k$ link, $x_p$ is the transmitted symbol from the PU transmitter $P_{Tx}$, with $\mathbb{E}\{|x_p|^2\} = P_p^1$, where the superscript 1 is used to denote that this is the transmitted power at the first communication phase, $n_k \sim \mathcal{CN}(0, N_0)$ is an additive white Gaussian noise (AWGN), and $\mathbb{E}\{\cdot\}$ denotes the expectation operation. The variables $h_{k,d}$, $g_{k,m}$, and $f_{p,d}$ are defined as the channel coefficients of the $R_k$→D, $R_k$→$P_m$, $P_{Tx}$→D links, respectively. All channel coefficients are assumed to follow the Rayleigh distribution, that is, the channel powers denoted by $|g_{s,m}|^2$, $|h_{s,k}|^2$, $|h_{k,d}|^2$, $|g_{k,m}|^2$, $|f_{p,k}|^2$, and $|f_{p,d}|^2$ are exponentially distributed random variables (RVs) with mean powers $\mu_{s,m}$, $\Omega_{s,k}$, $\Omega_{k,d}$, $\mu_{k,m}$, $\beta_{p,k}$, and $\beta_{p,d}$, respectively. Using (1), the signal-to-interference-plus-noise ratio (SINR) at the $k^{th}$ relay can be written as:

$$\gamma_{s,k} = \frac{\frac{I_p}{N_0} \frac{|h_{s,k}|^2}{W_1}}{\frac{P_p^1}{N_0} |f_{p,k}|^2 + 1} = \frac{X_{s,k}}{Y_1 + 1} = \frac{X_{s,k}}{Z_1}, \quad (2)$$

where $$W_1 = \min_m |g_{s,m}|^2,$$

$X_{s,k}$, $Y_1$, and $Z_1$ are some RVs used herein. Let $C_L$ denote a decoding set defined by the set of active relays that could have correctly decoded the source message in first phase of communication. It is defined as:

$$C_L \triangleq \left\{ k \in S_r : \frac{1}{2} \log_2(1 + \gamma_{S,k}) \geq R \right\}, \quad (3)$$
$$= \{ k \in S_r : \gamma_{S,k} \geq 2^{2R} - 1 \},$$

where $S_r$ is a set of L relays and R denotes a fixed spectral efficiency threshold.

In the second phase and after decoding the received message, a relay with the best second hop channel's SNR is selected from $C_L$ to forward the re-encoded copy of the SU source message to the SU destination. In order to satisfy the PU interference constraint and result in a best performance for the secondary system, the transmit power at $R_l$ must be $$P_{R_l} = I_p \bigg/ \min_m |g_{l,m}|^2.$$

The SINR at the destination resulting from the $l^{th}$ relay signal can be written as:

$$\gamma_{l,d} = \frac{\frac{I_p}{N_0} \frac{|h_{l,d}|^2}{W_2}}{\frac{P_p^2}{N_0} |f_{p,d}|^2 + 1} = \frac{X_{l,d}}{Y_2 + 1} = \frac{X_{l,d}}{Z_2}, \quad (4)$$

where $P_p^2$ is the transmitted power of the interferer at the second communication phase, $$W_2 = \min_m |g_{l,m}|^2 X_{l,d},$$

$Y_2$, and $Z_2$ are some RVs used herein. Equivalently, the relay with the best $X_{l,d}$ is selected to forward the source signal to destination, since the denominator is common to the SINRs from all relays belonging to $C_L$.

According to the present primary channel selection method for relay networks, at the beginning of first communication phase, the SU source obtains the channel information of the PU receivers ($g_{s,m}$, m=1, . . . , M), by either a direct reception of pilot signals from primary users or by exchange of channel information between primary and secondary users through a band manager. Using the estimated channels, the SU source knows which spectrum band to share with the PU and determines its transmit power using $$P_s = I_p \bigg/ \min_m |g_{s,m}|^2.$$

Then, the SU source sends its message to the K SU relays through which each relay calculates its first hop SINR ($\gamma_{S,k}$, k=1, . . . , K) using (2) and then compares it with the outage threshold $\gamma_{out}$. The relays whose SINRs are greater than $\gamma_{out}$ are called active relays. At the beginning of second communication phase and through sensing of pilot signals from PU receivers, the active relays obtain the channel information of their links with primary receivers ($g_{k,m}$, k=1, . . . , L; m=1, . . . , M). Using the estimated channels, each active relay knows which spectrum band to share with the PU and determines its transmit power using $$P_{R_l} = I_p \bigg/ \min_m |g_{l,m}|^2.$$

Then, each active relay sends a training sequence to the SU destination through which the SU destination calculates the signal-to-noise ratio (SNR) received from the relays ($X_{l,d}$, l=1, . . . , L). To avoid interference between relays while transmitting their training sequences, they can be coordinated to transmit in a time-division duplex manner. This is a feasible assumption in TDMA systems. Using the calculated SNRs and according to the opportunistic relay selection criterion, the destination sends a positive acknowledge or a 1-bit feedback to the relay who has the largest SNR asking him to start forwarding a re-encoded version of the source message to it. The interference channels at the relays may be locally estimated by the relay nodes as a step in decoding the source message before it is being forwarded to the destination. This helps in calculating the SINRs ($\gamma_{S,k}$, k=1, . . . , K) of the relays to compare with the outage threshold $\gamma_{out}$ when finding the set of active relays $C_L$. The relay selection in the second hop is performed using the numerators of SINRs received at the destination from the active relays ($X_{l,d}$, l=1, . . . , L). This is because the interference at the destination is common to the SNRs of all relays belonging to $C_L$. Also assume that the channels of the second hop transmission do not change while a decision on which relay is selected is made. Using the calculated SNRs and according to the opportunistic relay selection criterion, the destination sends a positive acknowledge or a 1-bit feedback to the relay who has the largest SNR asking him to start forwarding a re-encoded version of the source message to it. Steps of the proposed PU receiver selection protocol are detailed in Table 1.

TABLE 1

PU Receiver Selection Protocol Steps

| STEP | Function |
|---|---|
| 1 | SU source estimates ($g_{s,m}$, m = 1, . . . , M) |
| 2 | SU source calculates $P_s = I_p / \min_m |g_{s,m}|^2$ and sends its message to K relays |
| 3 | Relays calculate ($\gamma_{S,k}$, k = 1, . . . , K) |
| 4 | Test $\gamma_{S,j}$ until $\gamma_{S,j} \geq \gamma_{out}$ |
| 5 | $R_j \in D_L$ |
| 6 | Test for the $K^{th}$ relay j = K? |
| 7 | The relays in $C_L$ estimate $g_{l,m}$ for l = 1, . . . , L; m = 1, . . . , M |
| 8 | Each relay in $C_L$ calculates $P_l = I_p / \min_m |g_{l,m}|^2$ and sends a training sequence to SU destination |
| 9 | SU destination calculates $X_{l,d}$ and sends positive ACK to relay of max. $X_{l,d}$ |
| 10 | The relay of max. $X_{l,d}$ starts forwarding SU source message to SU destination |

With respect to exact closed-form expressions for the outage probability of the studied system for the independent non-identically distributed (i.n.i.d.) generic case of relay second hop channels, the outage probability is defined as the probability that the SINR at D goes below a predetermined outage threshold $\gamma_{out}$, i.e., $P_{out} = P_r[\gamma_D < \gamma_{out}]$ where $P_r[.]$ denotes the probability operation. Let $C_L$ be a decoding subset with a number of L active relays (i.e., cardinality $|C_L|=L$), then:

$$P_r[C_L] = \prod_{l \in C_L} P_r[\gamma_{S,l} \geq u] \sum_{m \notin C_L} P_r[\gamma_{S,m} < u], \quad (5)$$

where $u=(2^{2R}-1)$. The outage probability for the studied system can be written as $$P_{out} \triangleq P_r\left[\frac{1}{2}\log_2(1+\gamma_D) < R\right] \quad (6)$$

$$= \sum_{L=0}^{K} \sum_{C_L} P_r[\gamma_D < u \mid C_L] P_r[C_L],$$

where the internal summation is taken over all of $$\binom{K}{L}$$

possible subsets of size L from the set with the K relays. In order to evaluate (6), $P_r[\gamma_D < u | C_L]$ and $P_r[C_L]$ are first derived. The term $P_r[C_L]$ is obtained by first deriving the CDF of $\gamma_{S,k}$. This CDF conditioned on $W_1$ can be obtained using:

$$P_r[\gamma_{S,k} < u \mid W_1] = \int_1^{\infty} fZ_1(z) \underbrace{\int_0^{uz} fX_{s,k}(x \mid W_1)\,dx\,dz}_{FX_{s,k}(uz|W_1)}. \quad (7)$$

The probability density function (PDF) of $Z_1$ can be directly obtained from the PDF of $Y_1$ which is given for Rayleigh fading channels as $$f_{Y_1}(y) = \alpha_{p,k}\exp(\alpha_{p,k}y) \text{ where } \alpha_{p,k} = (\gamma_r^{-1}\beta_{p,k})^{-1},$$

where $\gamma_r^{-1} = \frac{P_p^1}{N_O}$.

Using transformation of RVs, the PDF of $Z_1$ can be easily obtained as $f_{z_1}(z)=\alpha_{p,k}\exp(-\alpha_{p,k})\exp(-\alpha_{p,k}z)$. The CDF of $X_{s,k}$ conditioned on $W_1$ can be obtained as:

$$F_{X_{s,k}}(x \mid W_1) = 1 - \exp(-\lambda_{s,k}W_1 x), \quad (8)$$

where $$\lambda_{s,k} = 1 / \left(\Omega_{s,k}\frac{I_p}{N_O}\right).$$

Upon substituting $f_{z_1}(z)$ and (8) in (7) and after doing the integration, the result is:

$$P_r[\gamma_{S,k} < u \mid W_1] = 1 - \alpha_{p,k}\frac{\exp(-(\lambda_{s,k}W_1 u))}{((\lambda_{s,k}W_1 u) + \alpha_{p,k})}. \quad (9)$$

Assuming i.n.i.d channels between the SU source and the PU receivers, the CDF and PDF of $W_1$ are respectively given by:

$$F_{W_1}(w) = 1 - \prod_{m=1}^{M}\left(1 - F_{|g_{s,m}|^2}(w)\right) \quad (10)$$

$$= 1 - \exp\left(-\sum_{m=1}^{M}\varsigma_{s,m}w\right)$$

$$f_{W_1}(w) = \sum_{m=1}^{M}\varsigma_{s,m}\exp\left(-\sum_{m=1}^{M}\varsigma_{s,m}w\right),$$

where $\varsigma_{s,m}=1/\mu_{s,m}$. Now, averaging over the PDF of $W_1$ using $\int_0^\infty P_r[\gamma_{S,k}<u|W_1]f_{W_1}(w)dw$, the following relation is obtained:

$$P_r[\gamma_{s,k}<u] = 1 + \alpha_{p,k}, \quad (11)$$

$$\left(\frac{\sum_{m=1}^{M}\varsigma_{s,m}}{\lambda_{s,k}}\right)\exp\left(\alpha_{p,k}\left(1+\frac{\sum_{m=1}^{M}\varsigma_{s,m}}{\lambda_{s,k}u}\right)\right)Ei\left(-\alpha_{p,k}\left(1+\frac{\sum_{m=1}^{M}\varsigma_{s,m}}{\lambda_{s,k}u}\right)\right)u^{-1},$$

where $Ei(\cdot)$ is an Exponential integral. Upon substituting (11) in (5), the term $P_r[C_L]$ can be calculated. The second term in (6) is derived which is $P_r[\gamma_D<u|C_L]$. With opportunistic or best-relay selection scheme, the CDF of $\gamma_D$ conditioned on $C_L$, $W_2$ can be obtained using:

$$P_r[\gamma_D<u|C_L,W_2] = \int_1^\infty f_{Z_2}(z)\underbrace{\int_0^{uz}f_{X_{sel}}(x|W_2)dxdz}_{F_{X_{sel}}(uz|W_2)} \quad (12)$$

where $f_{X_{Sel}}(x|W_2)$ is the PDF of the best relay conditioned on $W_2$. The PDF of $Z_2$ can be directly obtained from the PDF of $Y_2$ which is given for Rayleigh fading channels as:

$f_{Y_2}(y)=\alpha_{p,d}\exp(-\alpha_{p,d}y)$, where $\alpha_{p,d}=(\bar{\gamma}_d^I\beta_{p,d})^{-1}$, where $$\bar{\gamma}_d^I = \frac{P_p^I}{N_o}.$$

Using transformation of RVs, the PDF of $Z_2$ can be easily obtained as $fZ_2(z)=\alpha_{p,d}\exp(-\alpha_{p,d})\exp(-\alpha_{p,d}z)$. The CDF of $X_{Sel}$ conditioned on $W_2$ can be written as:

$$F_{X_{Sel}}(x|W_2) = \Pi_{l=1}^{L}F_{l,d}(x|W_2), \quad (13)$$

where $F_{l,d}(x|W_2)$ is given by:

$$F_{X_{l,d}}(x|W_2) = 1-\exp(-\lambda_{l,d}W_2 x), \quad (14)$$

where $$\lambda_{l,d} = 1 \Big/ \left(\Omega_{l,d}\frac{I_p}{N_O}\right).$$

Upon substituting (14) in (13), and applying the identity:

$$\prod_{l=1}^{L}(1-q_l) = \sum_{l=0}^{L}\frac{(-1)^l}{l!}\sum_{n_1,\ldots,n_l}^{L}\prod_{t=1}^{l}q_{n_t}, \quad (15)$$

with $\Sigma_{n_1,\ldots,n_l}^{L}$ being a short hand-notation for $$\sum\cdots\sum_{\substack{n_1=\ldots=n_l=1,\\n_1\neq\ldots\neq n_l}} \quad (13)$$

can be rewritten as:

$$F_{X_{sel}}(x|W_2) = \sum_{l=0}^{L}\frac{(-1)^l}{l!}\sum_{n_1,\ldots,n_l}^{L}\prod_{t=1}^{l}\exp(-\lambda_{n_t,d}W_2 x). \quad (16)$$

Upon substituting (16) in (12), and after simple manipulations, the following relation is obtained:

$$P_r[\gamma_D<u|C_L,W_2] = \alpha_{p,d}\sum_{l=0}^{L}\frac{(-1)^l}{l!}\sum_{n_1,\ldots,n_l}^{L}\prod_{t=1}^{l}\frac{\exp(-\lambda_{n_t,d},W_2 x)}{(\lambda_{n_t,d}W_2 u+\alpha_{p,d})}. \quad (17)$$

Assuming i.n.i.d channels between the SU relays and the PU receivers, the CDF and PDF of $W_2$ are respectively given by:

$$F_{W_2}(w) = 1 - \prod_{m=1}^{M}\left(1 - F_{|g_{n_t,m}|^2}(w)\right) \quad (18)$$

$$= 1 - \exp\left(-\sum_{m=1}^{M}\varsigma_{n_t,m}w\right)$$

$$f_{W_2}(w) = \sum_{m=1}^{M}\varsigma_{n_t,m}\exp\left(-\sum_{m=1}^{M}\varsigma_{n_t,m}w\right),$$

where $\varsigma_{n_p,m}=1/\mu_{n_p,m}$ Averaging over the PDF of $W_2$ using:
$\int_0^\infty P_r[\gamma_D<u|C_L,W_1]f_{w_1}(w)dw$,
the following relation is obtained:

$$P_r[\gamma_D<u|C_L] = -\alpha_{p,d}\sum_{l=0}^{L}\frac{(-1)^l}{l!} \quad (19)$$

$$\sum_{n_1,\ldots,n_l}^{L}\prod_{t=1}^{l}\left(\frac{\sum_{m=1}^{M}\varsigma_{s,m}}{\lambda_{n_t,d}}\right)\exp\left(\frac{\sum_{m=1}^{M}\varsigma_{n_t,m}}{\lambda_{n_t,d}u}\right)\times Ei\left(\frac{\sum_{m=1}^{M}\varsigma_{n_t,m}\alpha_{p,d}}{\lambda_{n_t,d}u}\right)u^{-1}$$

Having the terms $P_r[C_L]$, $P_r[\gamma_D<u|C_L]$ being obtained, a closed-form expression for the outage probability in (6) can be achieved.

Due to complexity of the achieved expressions in previous sections, it is hard to get more insights about system performance. Therefore, we see it is important to derive simple expressions where more insights about the system behavior can be achieved.

At high SNR values, the outage probability can be expressed as $P_{out} \approx (G_c SNR)^{-G_d}$, where $G_c$ denotes the coding gain of the system and $G_d$ is the diversity order of the system. The relays are assumed to have identical second hop channels ($X_{l,d}$, l=1, ..., L) and identical, R→$P_m$ links ($\gamma_{S,k}$, k=1, ..., K) and ($\gamma_{S,k}$, k=1, ..., K). Also, the channels between the SU source and PU receivers S→$P_m$ are assumed to be identical ($\gamma_{S,k}$, k=1, ..., K). As $$\frac{I_p}{N_o} \to \infty,$$

the CDF in (8) simplifies to $F_{X_{s,k}}(x|W_1) \approx \lambda_{s,k} W_1 x$. Upon substituting this CDF in (7) the CDF $P_r[\gamma_{S,k} < u]$ which is a part of the term $P_r[C_L]$ can be obtained at high SNR values as:

$$P_r[\gamma_{s,k} < u] \approx \frac{\exp(\alpha_{p,k})}{\alpha_{p,k}} \left( \frac{\lambda_{s,k}}{M\varsigma_{s,p}} \right) r(2, \alpha_{p,k}) u. \quad (20)$$

In evaluating $P_r[\gamma_{r,d} < u | C_L]$, as $$\frac{I_p}{N_O} \to \infty,$$

the CDF in (14) simplifies for the identical case to $F_{X_{r,d}}(x|W_2) \approx \lambda_{r,d} W_{2y}$. Upon substituting this CDF in (12) the term $P_r[\gamma_{r,d} < u | C_L]$ can be obtained at high SNR as:

$$P_r[\gamma_{r,d} < u | C_L] \approx L!(\alpha_{p,d})^{-L} \left( \frac{\lambda_{r,d}}{M\varsigma_{r,p}} \right)^L u^L. \quad (21)$$

The transmit power of the PU transmitter can be assumed to be fixed or it can be assumed to be dependent of and scaling with the transmit power of the SU transmitters. In practice, the network where the interference power scales with the desired user power is called symmetric network; whereas, the network where the interference power is fixed and not related to the desired user power is called asymmetric network. These two cases are considered in the following analysis.

Where $\bar{\gamma}_r^I$, $\bar{\gamma}_d^I$ are constants (asymmetric network), the outage probability for this case is dominated by the first term in (6) which was obtained in (21). For this case, the parameter $\alpha_{p,d}$ can be approximated by $\alpha_{p,d} \approx (\bar{\gamma}_d^I \beta_{p,d})^{-1}$. For the identical case $$\lambda_{r,d} = 1 \Big/ \left( \Omega_{r,d} \frac{I_p}{N_O} \right).$$

Hence, the outage probability at high SNR values can be obtained in a simple expression as:

$$P_{out}^{\infty} = \left[ (L!)^{-1/L} \left( \frac{\bar{\gamma}_d^I \beta_{f_{p,d}} M\varsigma_{s,p} \Omega_{r,d}}{\gamma_{out}} \frac{I_p}{N_0} \right) \right]^{-L}. \quad (22)$$

As can be seen from (22), the coding gain of the system is affected by the parameters $\bar{\gamma}_d^I$, $\beta_{p,d}$, M, $\varsigma_{s,p}$, $\Omega_{r,d}$, and $\gamma_{out}$; while the diversity order equals the number of active relays L. The maximum number of active relays in DF relay networks could reach the total number of relays K and this makes the diversity order of the system in (22) equal K. Furthermore, it can be noticed from (22) that the diversity order of cognitive opportunistic DF relay networks with partial-relay selection is the same as that of its non-cognitive counterpart and is independent of the primary cell. With fixed interference power, the interference from primary users will be degrading the performance of the secondary users through affecting the coding gain without affecting the diversity order.

In the second case where $\bar{\gamma}_r^I$, $\bar{\gamma}_d^I$ are scaling with SNR (symmetric network) the interference powers can be expressed as $$\bar{\gamma}_r^I = a \frac{I_p}{N_O}, \bar{\gamma}_d^I = b \frac{I_p}{N_O},$$

where a, b are some positive numbers. As the interference at the relays differs than that at the destination, we have the following different subcases;

$$\bar{\gamma}_r^I = a \frac{I_p}{N_O} \text{ or } \bar{\gamma}_d^I = b \frac{I_p}{N_O} \text{ or } \bar{\gamma}_r^I = a \frac{I_p}{N_O} \text{ and } \bar{\gamma}_d^I = b \frac{I_p}{N_O}.$$

With $$\bar{\gamma}_r^I = a \frac{I_p}{N_O}$$

and fixed $\bar{\gamma}_d^I$, the outage probability for this case is dominated by the second term in (6) which was obtained in (20). Also, the parameter $\alpha_{p,r}$ can be approximated by $$\alpha_{p,r} \approx (\bar{\gamma}_r^I \beta_{p,r})^{-1} = \left( a \frac{I_p}{N_O} \beta_{p,r} \right)^{-1}.$$

For the identical case, we have $$\lambda_{s,r} = 1 \Big/ \left( \Omega_{s,r} \frac{I_p}{N_O} \right).$$

Hence, the outage probability at high SNR values can be obtained in a simple expression as:

$$P_{out}^{\infty} = \left( a \frac{I_p}{N_O} \beta_{p,r} \right) \exp\left( 1/a \frac{I_p}{N_O} \beta_{p,r} \right) \left( \frac{\gamma_{s,k} \frac{I_p}{N_O}}{M\varsigma_{s,p}} \right)^{-1} r\left( 2, 1/a \frac{I_p}{N_O} \beta_{p,r} \right) \gamma_{out} \quad (23)$$

$$= (a\beta_{p,r})(\Omega_{s,r}/M\mu_{s,p})^{-1} \gamma_{out}$$

where at high SNR, the exponential term and the incomplete Gamma function term in the first line of (23) reach the value of 1. As can be seen from (23), when the interference at the relays has a power that scales with SNR, the diversity gain of the system reaches zero and a noise floor is expected to appear in the results. In such case, the system performance is affected by various parameters, such as $\beta_{p,r}$, $\Omega_{s,r}$, M, $\mu_{s,p}$, and $\gamma_{out}$.

When the interference at the destination scales with SNR $$\gamma_d^I = b \frac{I_p}{N_O}$$

and the interference at the relays has a fixed power, the outage probability for this case is dominated by the first term in (6) which was obtained in (21). Also, the parameter $$\alpha_{p,d} \approx (\overline{\gamma}_d^I \beta_{p,d})^{-1} = \left(b \frac{I_p}{N_O} \beta_{p,d}\right)^{-1}.$$

For the identical case, we have $$\lambda_{r,d} = 1 \bigg/ \left(\Omega_{r,d} \frac{I_p}{N_O}\right).$$

Hence, the outage probability at high SNR values can be obtained in a simple expression as:

$$P_{out}^\infty = \left[(L!)^{-1/L} \left(\frac{\overline{\gamma}_d^I \beta_{p,d} M \varsigma_{r,p} \Omega_{r,d}}{\gamma_{out}}\right)\right]^{-L}. \quad (24)$$

It is clear from (24) that when the interference at the destination has a power that scales with SNR, the system achieves a diversity gain of zero and the system performance is affected by various parameters including L, $\overline{\gamma}_d^I$, $\beta_{p,d}$, M, $\varsigma_{r,p}$, $\Omega_{r,d}$, and $\gamma_{out}$.

Finally, when the interference at the relays and the interference at the destination have powers that scale with SNR $$\gamma_r^I = a \frac{I_p}{N_O}, \gamma_d^I = b \frac{I_p}{N_O},$$

the outage probability for this case was shown to be dominated by the second term in (6) which was obtained in (20). Therefore, the outage probability for this case is similar to that found in (23) where the diversity gain reaches zero and the system behavior is affected by several parameters including $\beta_{p,r}$, M, $\mu_{s,p}$, $\Omega_{s,r}$, and $\gamma_{out}$.

The present primary channel selection method for relay networks may be implemented in cognitive radios such as for example, without limitation transceiver 900 (shown in FIG. 9) which comprises transmitter 901, receiver 903, controller 905, channel status database 907, memory 919, user interface 921, power module 927, and interference measurement module 935. In the embodiment, transceiver 900 receives and transmits information in a network such as network 100 illustrated in FIG. 1. In the aforementioned half-duplex operation receiver 903 and transmitter 901 share antenna 931 in a manner that may support half-duplex operation. The PU receiver selection protocol steps detailed above and outlined in Table 1 may be performed by controller 905 in operable communication with memory 919, channel status database 907, interference measurement module 935 receiver 903 and transmitter 901. For example, controller 905 may process the data received by receiver 903 and transmitted by transmitter 901.

The cognitive information required to implement the primary channel selection method for relay networks may be stored in the channel status database 907. Additionally, the controller may determine interference levels, as measured by interference measurement module 935 to assist in the channel estimations required by the present primary channel selection method. Transceiver 900 may share information about the measured interference levels with other transceivers in network 100 (shown in FIG. 1).

Memory 919 may also store instructions for controller 905 to execute steps of the present primary channel selection method for relay networks. User interface 921 enables a user to operate the cognitive radio while power unit 927 allows the other components of cognitive radio 900 to be energized.

Figure 9:
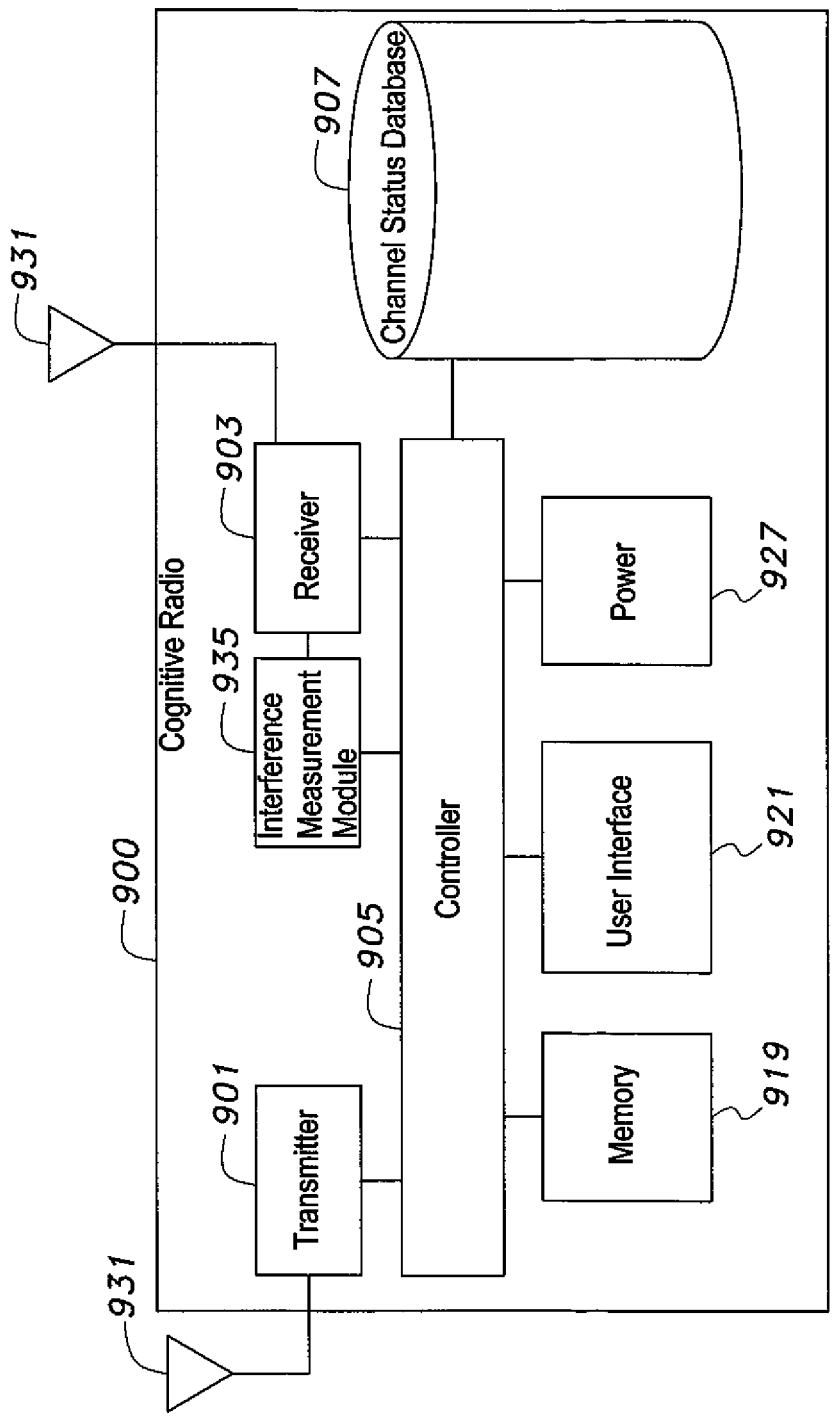
FIG. 9 is a block diagram showing a possible architecture of a cognitive radio using the primary channel selection method for relay networks according to the invention.

It should be understood by one of ordinary skill in the art that the cognitive radio 900 presented in FIG. 9 is exemplary only and that the present method can comprise software or firmware code executing on a computer, a microcontroller, a microprocessor, or a DSP processor, state machines implemented in application specific or programmable logic; or numerous other forms without departing from the spirit and scope of the invention. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

With respect to validation of the achieved analytical and asymptotic expressions, comparison metrics were compiled using Monte-Carlo simulations. Some numerical examples are provided to show the effect of the interference and some system parameters such as number of relays and number of PU receivers on the system performance.

Figure 2:
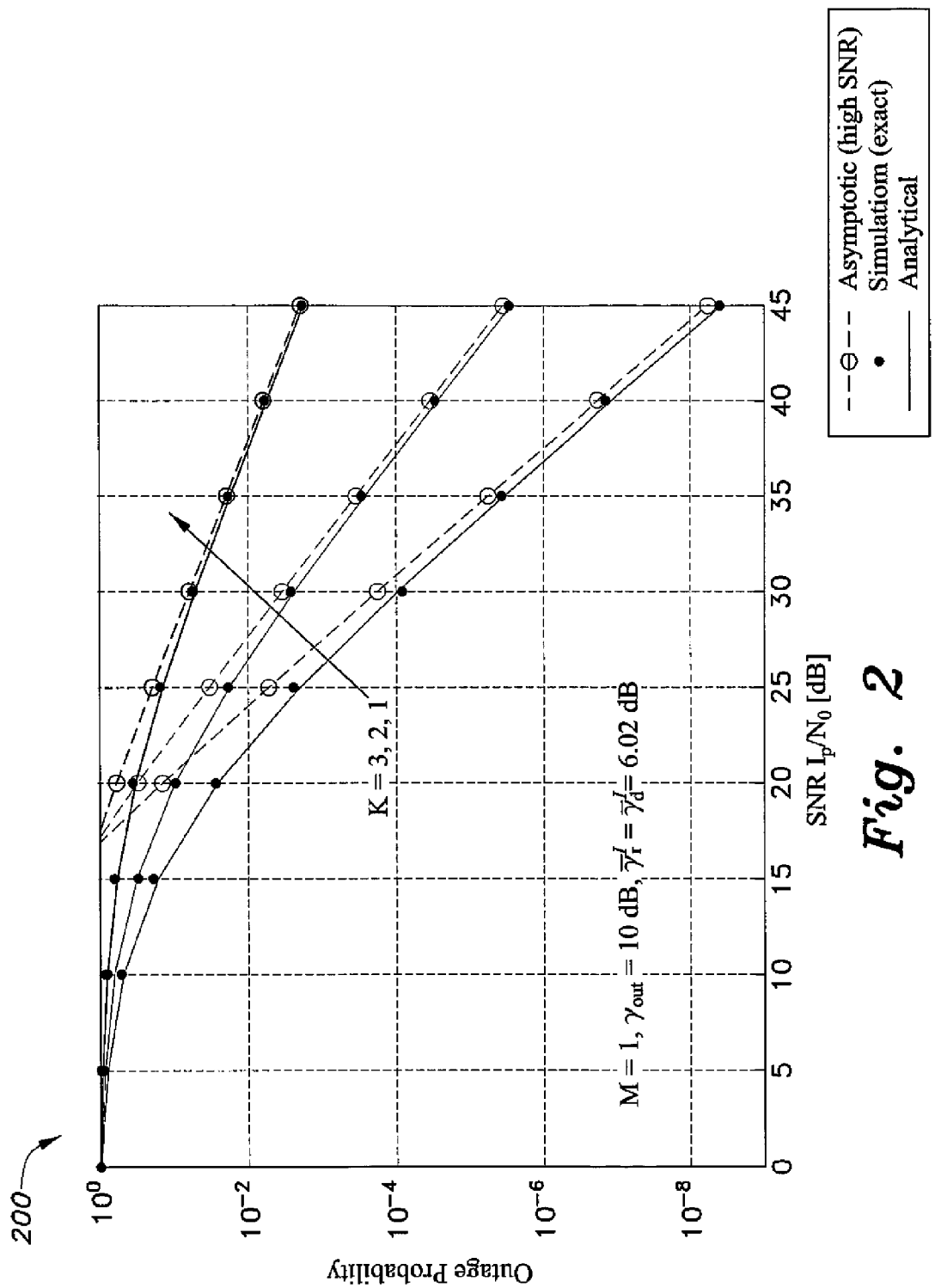
FIG. 2 is a plot showing outage probability vs SNR (signal to noise ratio) of cognitive opportunistic DF relay network with interference and multiple PU receivers for different values of K.

Plot 200 of FIG. 2 portrays the outage performance versus SNR for different numbers of relays K, and demonstrates that perfect fitting exists between the analytical and asymptotic results with Monte-Carlo simulations. Also, plot 200 demonstrates that with constant interference power, as K increases, the diversity order of the system increases and the system performance enhances. This is clear from the asymptotic results where the diversity order equals K when the interference power is fixed. Moreover, as shown in FIG. 2, the system can still achieve full diversity gain as SNR increases.

Figure 3:
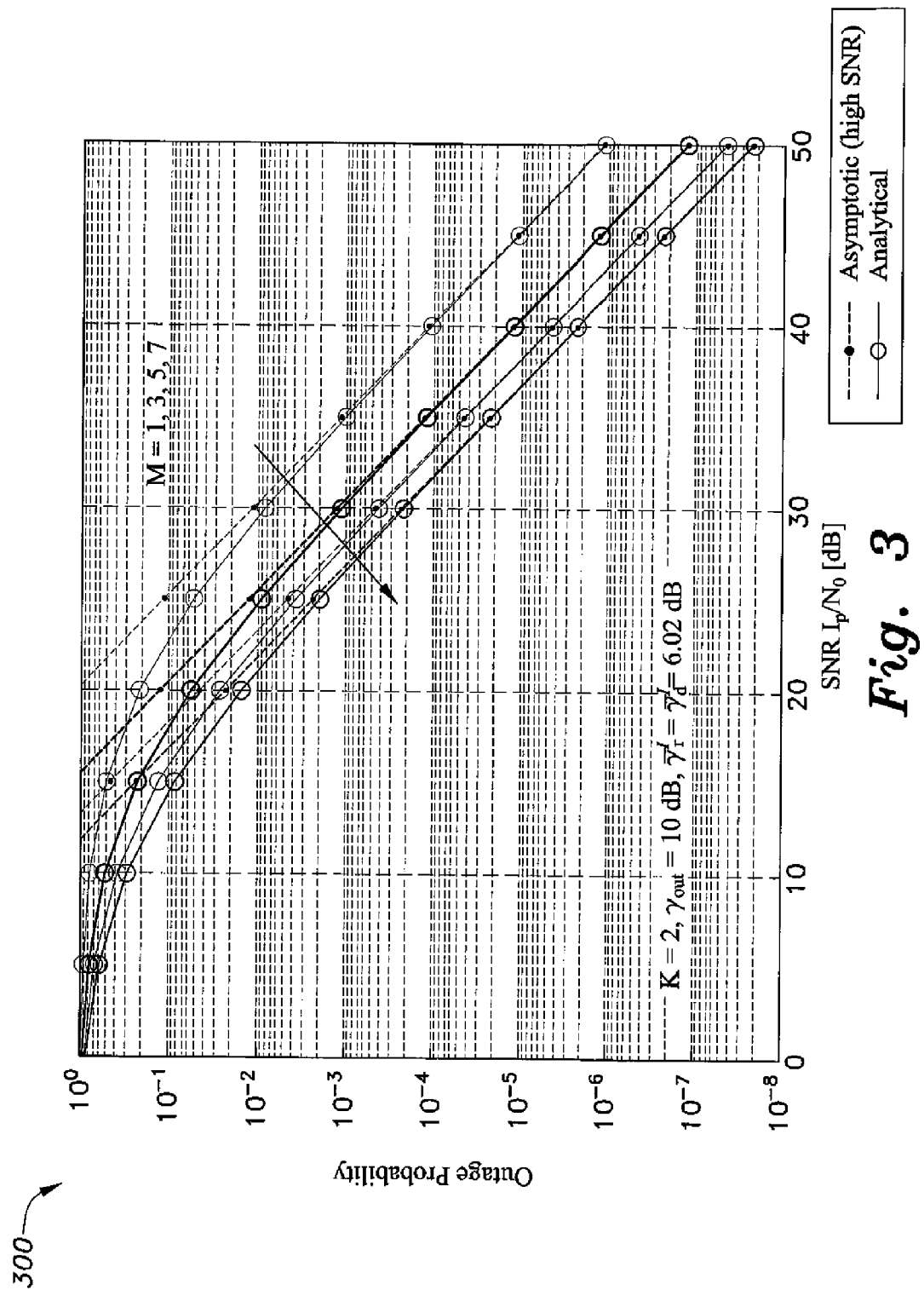
FIG. 3 is a plot showing outage probability vs SNR of cognitive opportunistic DF relay network with interference and multiple PU receivers for different values of M.

The effect of number of PU receivers M on the system performance is studied in plot 300 of FIG. 3. Again, the perfect fitting between the analytical results and asymptotic results is clear in plot 300. More importantly, plot 300 shows that as M increases, better the achieved performance. This is because having more PU receivers increases the probability to find primary receivers of weak channels and hence, higher the transmit power of the SU transmitters. Furthermore, plot 300 shows that the number of PU receivers affects the system performance through affecting its coding gain and not the diversity order. Again, this fact was proved by the asymptotic results.

Figure 4:
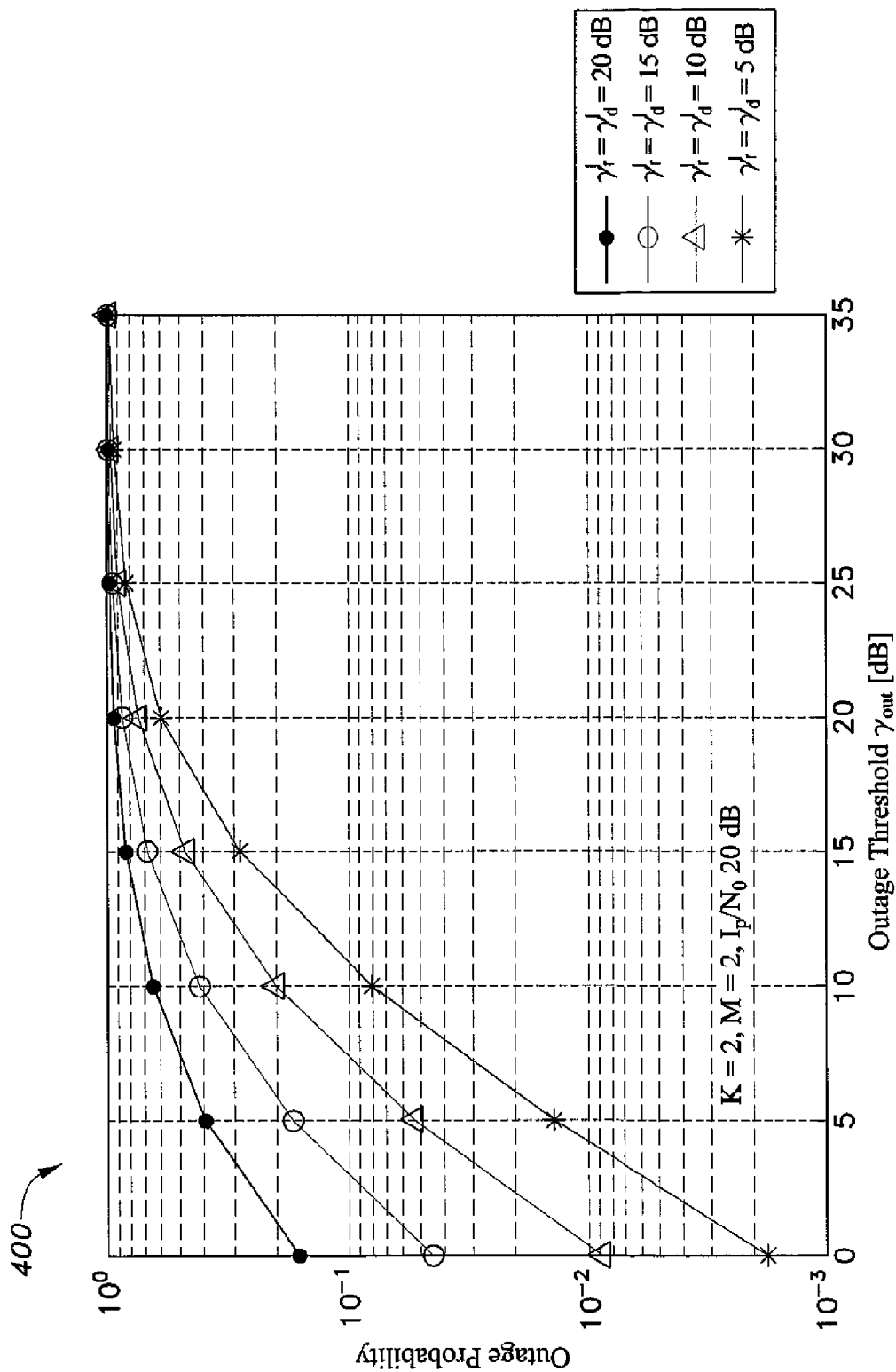
FIG. 4 is a plot showing outage probability vs out of cognitive opportunistic DF relay network with interference and multiple PU receivers for a first set of values of $\bar{\gamma}_r^I$ and $\bar{\gamma}_d^I$.

Plot 400 of FIG. 4 illustrates the interference effect on the system performance. It portrays the outage behavior versus outage threshold $\gamma_{out}$ for different values of interference powers $\bar{\gamma}_r^I, \bar{\gamma}_d^I$ when they are equal. As expected, as $\bar{\gamma}_r^I, \bar{\gamma}_d^I$ increase, the achieved performance gets worse. Also, the continuous increase in $\gamma_{out}$ results in a unity outage probability.

Figure 5:
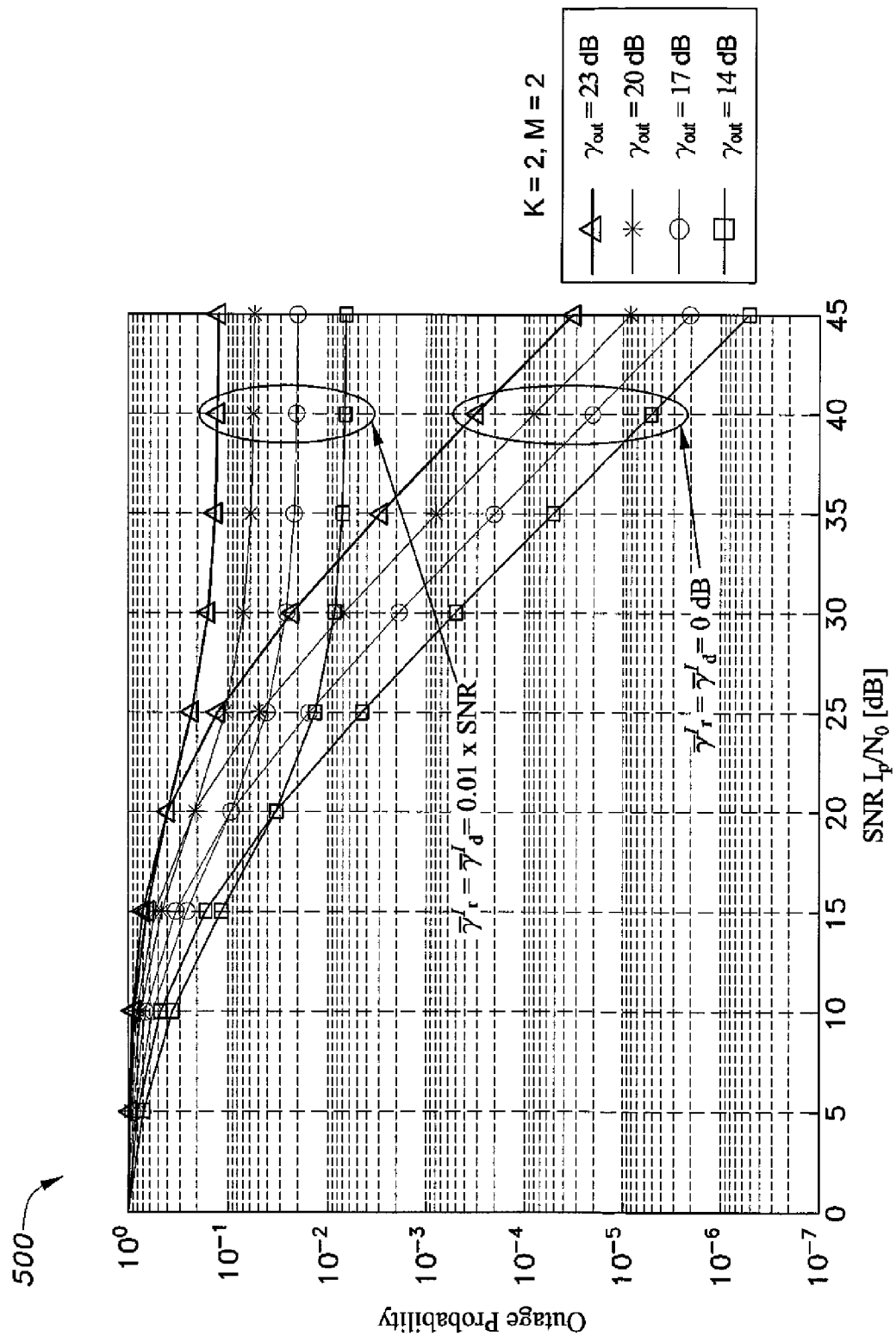
FIG. 5 is a plot showing outage probability vs SNR of cognitive opportunistic DF relay network with interference and multiple PU receivers for a second set of values of $\gamma_{out}$.

The outage performance versus SNR is shown in plot 500 of FIG. 5 for different values of outage threshold $\gamma_{out}$. Two cases are shown in plot 500; the case where the interference power scales with SNR and the case where the interference power is fixed. Plot 500 shows that when the interference power scales with SNR, the system diversity gain reaches zero and a noise floor appears in all curves of plot 500 due to the effect of interference on the system performance. On the other hand, when the interference power is fixed, the system performance keeps enhancing as SNR increases. Also, we see from this figure that the outage threshold is affecting the system behavior through affecting its coding gain and not the diversity order. the effect of interference on the system performance. On the other hand, when the interference power is fixed, the system performance keeps enhancing as SNR increases. Also, we see from this figure that the outage threshold is affecting the system behavior through affecting its coding gain and not the diversity order.

Figure 6:
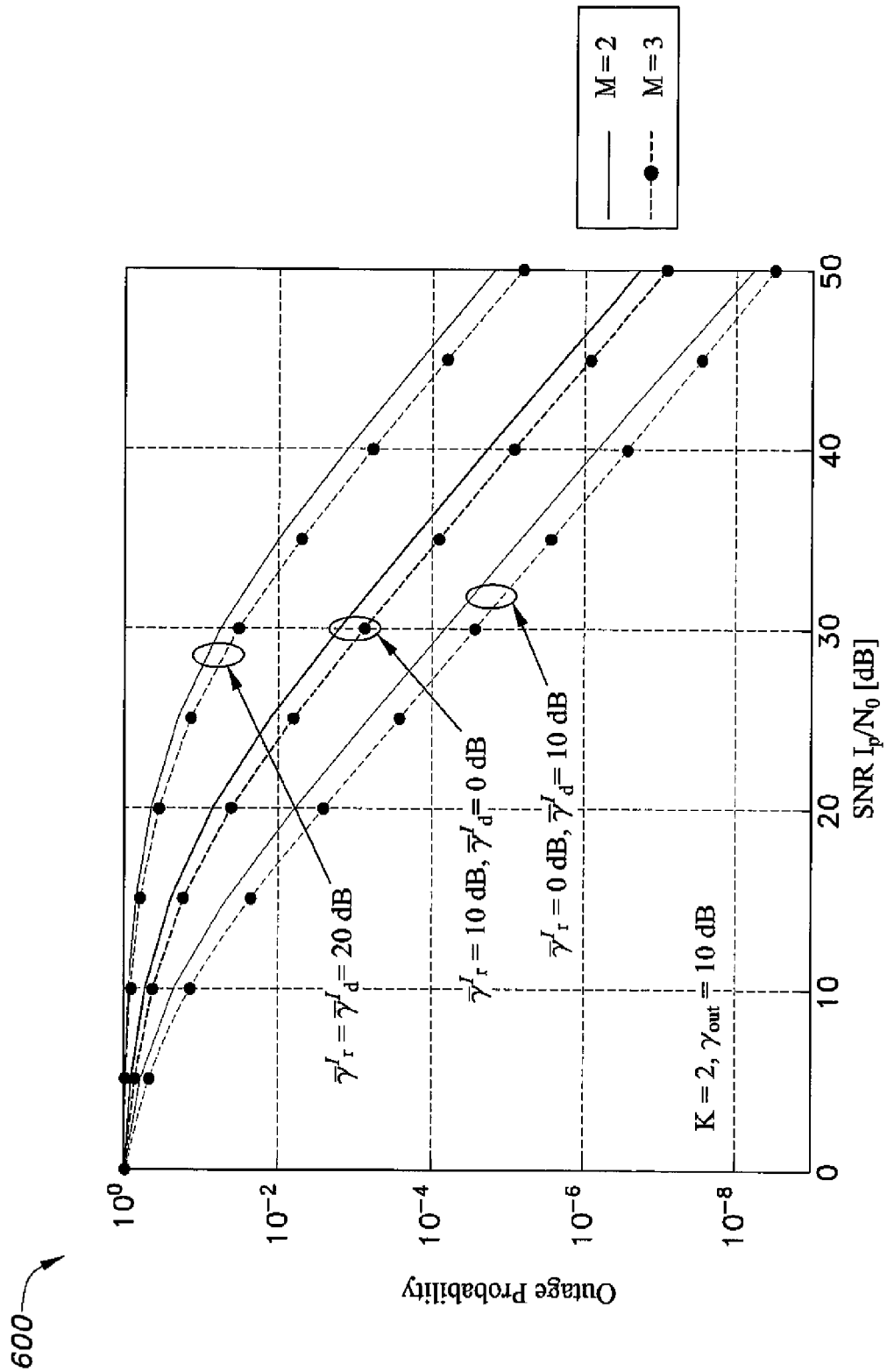
FIG. 6 is a plot showing outage probability vs SNR of cognitive opportunistic DF relay network with interference and multiple PU receivers for different values of $\bar{\gamma}_r^I, \bar{\gamma}_d^I$ and M.

Plot 600 of FIG. 6 shows the outage performance versus SNR for different numbers of PU receivers M and different values of interference powers $\bar{\gamma}_r^I, \bar{\gamma}_d^I$ including the case when they are unequal. Plot 600 shows a comparison of the interference severity at the relays and destination on the system performance. It is obvious from Plot 600 that the interference at the relay nodes is more severe on the system behavior compared to that at the destination node. This is because the interference at the relays affects the signal on the first hop which is also affecting the re-encoded signal on the second hop. In other words, the signal processing conducted by the relay nodes is negatively affected by the interference, resulting in a further degradation in the system performance. Furthermore, the enhancement in system performance due to having more PU receivers is clear in plot 600. Clearly, this enhancement in system performance happens in the coding gain and not the diversity order of the system.

Figure 7:
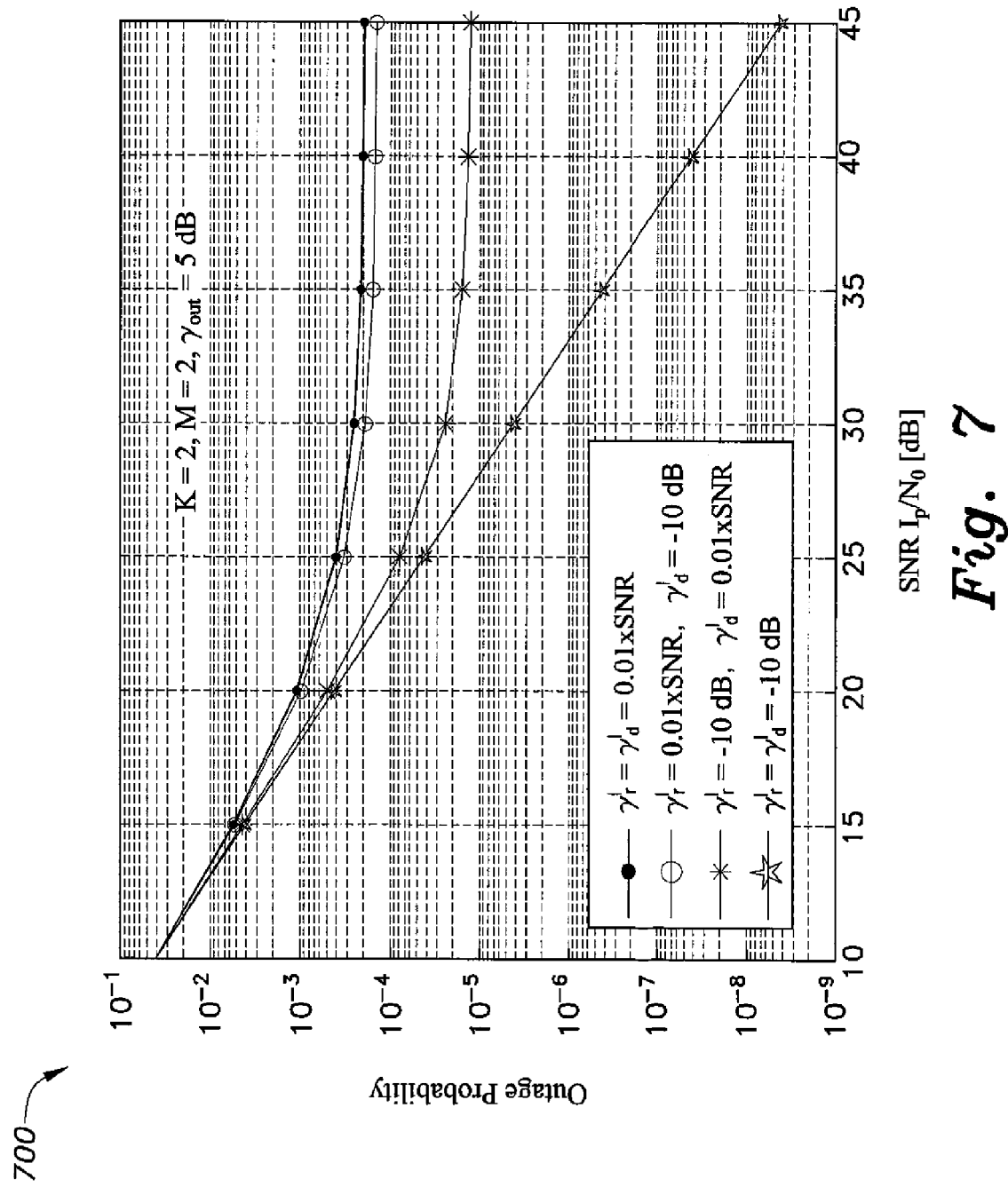
FIG. 7 is a plot showing outage probability vs SNR of cognitive opportunistic DF relay network with interference and multiple PU receivers for a third set of values of $\bar{\gamma}_r^I$ and $\bar{\gamma}_d^I$.

The asymptotic behavior of the system is studied in plot 700 of FIG. 7. Two cases are shown in plot 700; a system performance with full diversity gain and a system performance with zero diversity gain. The system can achieve full diversity gain only if the interference at the relays and destination is assumed to be fixed and not scaling with SNR. This was summarized in case 1 of the asymptotic analysis. On the other hand, when the interference at the relays or at the destination or at both scales with SNR, the system reaches zero diversity gain and a noise floor appears in the results due to the effect of interference on the system performance. Furthermore, it can be seen from plot 700 that the worst performance is achieved when both $\bar{\gamma}_r^I, \bar{\gamma}_d^I$ scale with SNR, as expected. Also, the case where $\bar{\gamma}_r^I$ scales with SNR results in worse performance compared to the case where $\bar{\gamma}_d^I$ scales with SNR as the interference at the relays is more severe on the system performance compared to that at the destination node. This result was also illustrated in FIG. 6.

Figure 8:
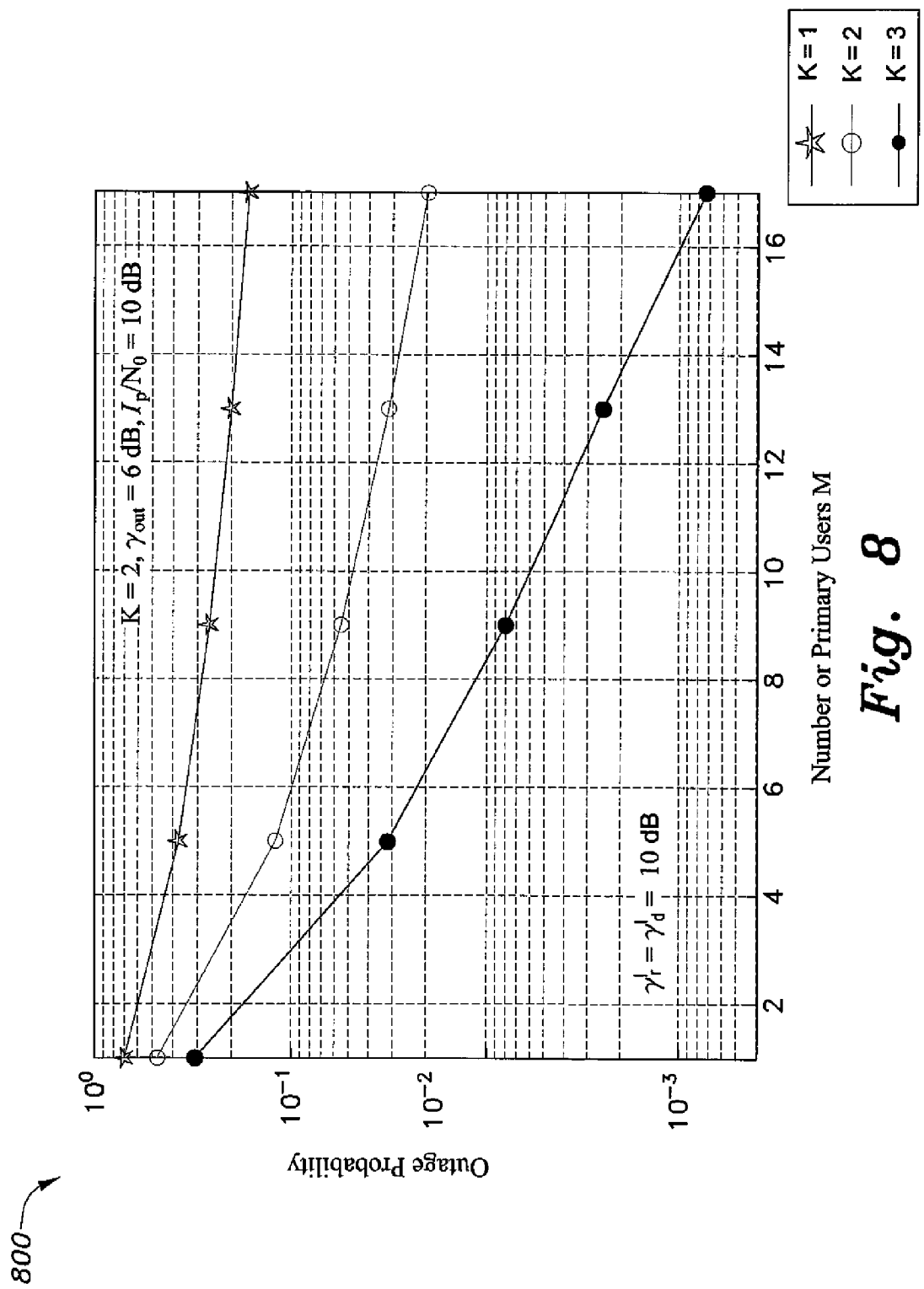
FIG. 8 is a plot showing outage probability Outage probability vs M of cognitive opportunistic DF relay network with interference and multiple PU receivers for a set of values of K.

Plot 800 of FIG. 8 studies the impact of number of PU receivers M on the system behavior. It portrays the outage performance versus M for different numbers of relays K. It can be seen from plot 800 that when M increases the outage probability decreases, but the slope of the curves depends on the value of K. The highest slope is achieved at the largest value of K, as expected.

The primary channel selection method for relay networks provides a new scenario in spectrum-sharing opportunistic DF relay networks where the PU receivers are assumed to utilize orthogonal spectrum bands in the presence of interference from PU transmitter. Closed-form expression was derived for the outage probability assuming the i.n.i.d. generic case of relays second hop channels. Furthermore, the system outage performance was evaluated at the high SNR regime where simple expressions for the outage probability, diversity order, and coding gain were derived. Monte-Carlo simulations proved the accuracy of the achieved analytical and asymptotic results. Main findings illustrated that with fixed interference power, the diversity order of the secondary system equals the number of relays and it is not affected by the number of PU receivers. Also, results showed that the number of PU receivers affects the system performance through affecting the coding gain. Finally, results illustrated that when the interference at the SU relays or the SU destination or at both scales with SNR, the system reaches a zero diversity gain and a noise floor appears in the results due to the effect of interference on the system performance.

It is to be understood that the present invention is not limited to the embodiments described above, but encompasses any and all embodiments within the scope of the following claims.

We claim:

1. A primary channel selection method for relay networks, comprising the steps of:
   selecting among available primary users one primary user receiver $P_{Sel}$ whose channel results in a best performance for users of a secondary system;
   sharing the one primary user receiver's spectrum with secondary users (source and relay); and
   restricting the sharing of the primary user receiver's spectrum bands only to the secondary users;
   wherein the spectrum bands of the primary user receivers are orthogonal and the best performance of the secondary system is achieved.

2. The primary channel selection method for relay networks according to claim 1, further comprising the steps of
   a secondary user (SU) S establishing a S→$R_k$ link to K relays; and
   the secondary user (SU) source S sending its message x to the K relays via the S→$R_k$ link under a transmit power constraint guaranteeing that interference with the selected PU receiver $P_{Sel}$ does not exceed a threshold $I_p$.

3. The primary channel selection method for relay networks according to claim 2, further comprising the step of the secondary user (SU) source S calculating the transmit power constraint utilizing a formula characterized by the relation:

$$P_S = I_P / \min_m |g_{s,m}|^2,$$

where $P_S$ is the SU source transmit power, $g_{s,m}$ is a channel coefficient of an S→$P_m$ link established during a first communication phase, said SU source S obtaining said $g_{s,m}$ by either a direct reception of pilot signals from primary users or by exchange of channel information between primary and secondary users through a band manager.

4. The primary channel selection method for relay networks according to claim 3, further comprising the steps of:
   said multiple relays ($R_k$) establishing a $R_k \rightarrow D$ link to a secondary destination D;
   said multiple relays ($R_k$) establishing an interfering $R_k \rightarrow P_k$ link to the $k^{th}$ primary receiver $P_k$;
   a primary transmitter $P_{Tx}$ establishing an interfering link $P_{Tx} \rightarrow D$ to the secondary destination D; and
   each relay calculating a first hop SINR representing the received signal transmitted by S at the $k^{th}$ relay said calculation being characterized by the relation:

$$\gamma_{S,k} = \sqrt{P_S} h_{S,k} x_0 + \sqrt{P_p^1} f_{p,k} x_p + n_k,$$

where $\gamma_{S,k}$ is the first hop SINR, $h_{S,k}$ is the channel coefficient of the $S \rightarrow R_k$ link, $x_0$ is the transmitted symbol from the SU source S with $\mathbb{E}\{|x_0|^2\} = P_0$, $f_{p,k}$ is the channel coefficient of the $P_{Tx} \rightarrow R_k$ link, $x_p$ is the transmitted symbol from the PU transmitter $P_{Tx}$ with $$\mathbb{E}\{|x_p|^2\} = P_p^1,$$

where the superscript 1 is used to denote that this is the transmitted power at a first communication phase, $n_k \sim \mathcal{CN}(0, N_0)$ being noise in the communication links, $\mathbb{E}\{\cdot\}$ denoting an expectation operation.

5. The primary channel selection method for relay networks according to claim 4, further comprising the step of selecting active relays, said active relays being defined as the relays whose received signal is at least as strong as an outage threshold $\gamma_{out}$;
   wherein a signal-to-interference-plus-noise ratio (SINR) at the $k^{th}$ relay is characterized by the relation:

$$\gamma_{S,k} = \frac{\frac{I_p}{N_O} \frac{|h_{s,k}|^2}{W_1}}{\frac{P_p^1}{N_O}|f_{p,k}|^2 + 1} = \frac{X_{s,k}}{Y_1 + 1} = \frac{X_{s,k}}{Z_1},$$

where $$W_1 = \min_{m} |g_{s,m}|^2,$$

$X_{s,k}$, $Y_1$, and $Z_1$ are first communication phase random variables (RVs) used herein.

6. The primary channel selection method for relay networks according to claim 5, further comprising the step of identifying a decoding set $C_L$ of the active relays, said $C_L$ being defined as the set of active relays that could have correctly decoded the source message upon initial establishment of the $R_k \rightarrow D$ link and being characterized by the relation:

$$C_L \triangleq \left\{ k \in S_r : \frac{1}{2} \log_2(1 + \gamma_{S,k}) \geq R \right\}$$

$$= \{k \in S_r : \gamma_{S,k} \geq 2^{2R} - 1\},$$

where $S_r$ is a set of L relays and R denotes a fixed spectral efficiency threshold.

7. The primary channel selection method for relay networks according to claim 6, further comprising the step of said decoding set $C_L$ of the active relays estimating channel coefficients $g_{l,m}$ subject to the PU interference constraint and a transmit power at a relay $R_l$ of the decoding set $C_L$, the $R_l$ transmit power being characterized by the relation:

$$P_{R_l} = I_p / \min_{m} |g_{l,m}|^2; \text{ and}$$

said decoding set $C_L$ of the active relays sending a training sequence to the secondary destination D at said $R_l$ transmit power.

8. The primary channel selection method for relay networks according to claim 7, further comprising the steps of:
   the secondary destination D calculating a maximum $X_{l,d}$ based on a signal-plus-noise ratio (SINR) at the secondary destination D resulting from the $l^{th}$ relay signal said SINR being characterized by the relation:

$$\gamma_{l,d} = \frac{\frac{I_p}{N_O} \frac{|h_{l,d}|^2}{W_2}}{\frac{P_p^2}{N_O}|f_{p,d}|^2 + 1} = \frac{X_{l,d}}{Y_2 + 1} = \frac{X_{l,d}}{Z_2},$$

where $P_p^2$ is the transmitted power of the interferer at a second communication phase, $$W_2 = \min_{m} |g_{l,m}|^2, X_{l,d},$$

$Y_2$, and $Z_2$ are second communication phase RVs used herein, $X_{l,d}$ is the signal-to-noise ratio (SNR) received from the relays; and
   the secondary destination D sending a positive acknowledge signal to the relay having the maximum $X_{l,d}$.

9. The primary channel selection method for relay networks according to claim 8, further comprising the step of said relay with the maximum $X_{l,d}$ forwarding said message x from said SU source S to said secondary destination D.

10. The primary channel selection method for relay networks according to claim 9, further comprising the step of coordinating the training sequences transmitted by the relays to transmit in a time-division duplex manner.

11. A computer software product, comprising a non-transitory medium readable by a processor, the non-transitory medium having stored thereon a set of instructions for performing a primary channel selection method for relay networks, the set of instructions including:
   (a) a first sequence of instructions which, when executed by the processor, causes said processor to select among available primary users one primary user receiver $P_{Sel}$ whose channel results in a best performance for users of a secondary system;
   (b) a second sequence of instructions which, when executed by the processor, causes said processor to share the one primary user receiver's spectrum with secondary users (source and relay); and
   (c) a third sequence of instructions which, when executed by the processor, causes said processor to restrict the sharing of the primary user receiver's spectrum bands only to the secondary users;

wherein the spectrum bands of the primary user receivers are orthogonal and the best performance of the secondary system is achieved.

12. The computer software product according to claim 11, further comprising:
   a fourth sequence of instructions which, when executed by the processor, causes said processor to utilize a secondary user (SU) S to establish a S→$R_k$ link to K relays; and
   a fifth sequence of instructions which, when executed by the processor, causes said processor to utilize the secondary user (SU) source S to send its message x to the K relays via the S→$R_k$ link under a transmit power constraint which guarantees that interference with the selected PU receiver $P_{Sel}$ does not exceed a threshold $I_p$.

13. The computer software product according to claim 12, further comprising:
   a sixth sequence of instructions which, when executed by the processor, causes said processor to calculate the transmit power constraint for the secondary user (SU) source S utilizing a formula characterized by the relation:

$$P_S = I_p / \min_m |g_{s,m}|^2,$$

where $g_{s,m}$ is a channel coefficient of an S→$P_m$ link established during a first communication phase, said SU source S obtaining said $g_{s,m}$ by either a direct reception of pilot signals from primary users or by exchange of channel information between primary and secondary users through a band manager.

14. The computer software product according to claim 13, further comprising:
   a seventh sequence of instructions which, when executed by the processor, causes said processor to establish a $R_k$→D link from said multiple relays ($R_k$) to a secondary destination D;
   an eighth sequence of instructions which, when executed by the processor, causes said processor to establish an interfering $R_k$→$P_k$ link from said multiple relays ($R_k$) to the $k^{th}$ primary receiver $P_k$;
   a ninth sequence of instructions which, when executed by the processor, causes said processor to establish an interfering link $P_{Tx}$→D from a primary transmitter $P_{Tx}$ to the secondary destination D; and
   a tenth sequence of instructions which, when executed by the processor, causes said processor to, for each relay, calculate a first hop SINR representing the received signal transmitted by S at the $k^{th}$ relay said calculation being characterized by the relation:

$$\gamma_{S,k} = \sqrt{P_S} h_{S,k} x_0 + \sqrt{P_p^1} f_{p,k} x_p + n_k,$$

where $\gamma_{S,k}$ is the first hop SINR, $h_{S,k}$ is the channel coefficient of the S→$R_k$ link, $x_0$ is the transmitted symbol from the SU source S with $\mathbb{E}\{|x_0|^2\}=P_0$, $f_{p,k}$ is the channel coefficient of the $P_{Tx}$→$R_k$ link, $x_p$ is the transmitted symbol from the PU transmitter $P_{Tx}$ with $\{|x_p|^2\}=P_p^1$, where the superscript 1 is used to denote that this is the transmitted power at a first communication phase, $n_k \sim \mathcal{CN}(0, N_0)$ being noise in the communication links, $\mathbb{E}\{\cdot\}$ denoting an expectation operation.

15. The computer software product according to claim 14, further comprising:
   an eleventh sequence of instructions which, when executed by the processor, causes said processor to select active relays, said active relays being defined as the relays whose received signal is at least as strong as an outage threshold $\gamma_{out}$; and
   wherein a signal-to-interference-plus-noise ratio (SINR) at the $k^{th}$ relay is characterized by the relation:

$$\gamma_{s,k} = \frac{\frac{I_p}{N_O} \frac{|h_{s,k}|^2}{W_1}}{\frac{P_p^1}{N_O}|f_{p,k}|^2 + 1} = \frac{X_{s,k}}{Y_1 + 1} = \frac{X_{s,k}}{Z_1},$$

where $$W_1 = \min_m |g_{s,m}|^2, X_{s,k}, Y_1,$$

and $Z_1$ are first communication phase RVs used herein.

16. The computer software product according to claim 15, further comprising:
   a twelfth sequence of instructions which, when executed by the processor, causes said processor to identify a decoding set $C_L$ of the active relays, said $C_L$ being defined as the set of active relays that could have correctly decoded the source message upon initial establishment of the $R_k$→D link and being characterized by the relation:

$$C_L \triangleq \left\{ k \in S_r : \frac{1}{2} \log_2(1 + \gamma_{S,k}) \geq R \right\}$$
$$= \{k \in S_r : \gamma_{S,k} \geq 2^{2R} - 1\},$$

where $S_r$ is a set of L relays and R denotes a fixed spectral efficiency threshold.

17. The computer software product according to claim 16, further comprising:
   a thirteenth sequence of instructions which, when executed by the processor, causes said processor to have said decoding set $C_L$ of the active relays estimate $g_{l,m}$ subject to the PU interference constraint and a transmit power at an at $R_l$ of the decoding set $C_L$, the $R_l$ transmit power being characterized by the relation:

$$P_{R_l} = I_p / \min_m |g_{l,m}|^2;$$

and
   a fourteenth sequence of instructions which, when executed by the processor, causes said processor to have said decoding set $C_L$ of the active relays send a training sequence to the secondary destination D at said $R_l$ transmit power.

18. The computer software product according to claim 17, further comprising:
   a fifteenth sequence of instructions which, when executed by the processor, causes said processor to have the secondary destination D calculate a maximum $X_{l,d}$ based on a signal-plus-noise ratio (SINR) at the secondary destination D resulting from the $l^{th}$ relay signal said SINR being characterized by the relation:

$$\gamma_{l,d} = \frac{\frac{I_p}{N_O} \frac{|h_{l,d}|^2}{W_2}}{\frac{P_p^2}{N_O} |f_{p,d}|^2 + 1} = \frac{X_{l,d}}{Y_2 + 1} = \frac{X_{l,d}}{Z_2},$$

where $P_p^2$ is the transmitted power of the interferer at a second communication phase, $$W_2 = \min_{m} |g_{l,m}|^2, X_{l,d},$$

$Y_2$, and $Z_2$ are second communication phase RVs used herein, $X_{l,d}$ is the signal-to-noise ratio (SNR) received from the relays; and a sixteenth sequence of instructions which, when executed by the processor, causes said processor to have the secondary destination D send a positive acknowledge signal to the relay having the maximum $X_{l,d}$.

19. The computer software product according to claim 18, further comprising a seventeenth sequence of instructions which, when executed by the processor, causes said processor to have said relay with the maximum $X_{l,d}$ forward said message x from said SU source S to said secondary destination D.

20. The computer software product according to claim 19, further comprising an eighteenth sequence of instructions which, when executed by the processor, causes said processor to coordinate the training sequences transmitted by the relays to transmit in a time-division duplex manner.

* * * * *